(12) United States Patent
Yamaguchi et al.

(10) Patent No.: US 12,447,914 B2
(45) Date of Patent: Oct. 21, 2025

(54) VEHICLE-MOUNTED CONTROL DEVICE

(71) Applicant: Hitachi Astemo, Ltd., Hitachinaka (JP)

(72) Inventors: Naomichi Yamaguchi, Hitachinaka (JP); Yuta Tanaka, Hitachinaka (JP); Jin Sato, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 47 days.

(21) Appl. No.: 18/286,261

(22) PCT Filed: Jan. 27, 2022

(86) PCT No.: PCT/JP2022/003128
§ 371 (c)(1),
(2) Date: Oct. 10, 2023

(87) PCT Pub. No.: WO2022/254780
PCT Pub. Date: Dec. 8, 2022

(65) Prior Publication Data
US 2024/0042951 A1 Feb. 8, 2024

(30) Foreign Application Priority Data

May 31, 2021 (JP) ................. 2021-091066

(51) Int. Cl.
*B60R 16/023* (2006.01)
*G01R 31/54* (2020.01)
(52) U.S. Cl.
CPC .......... *B60R 16/0232* (2013.01); *G01R 31/54* (2020.01)
(58) Field of Classification Search
CPC ..... B60R 16/0232; B60R 16/03; G01R 31/54; G01R 31/007; G01R 31/52
See application file for complete search history.

(56) References Cited

U.S. PATENT DOCUMENTS

| 2016/0204633 A1* | 7/2016 | Furuto | G01R 31/40 320/136 |
| 2019/0326742 A1 | 10/2019 | Jyumonji | |
| 2023/0155372 A1* | 5/2023 | Shiraishi | H01M 50/574 307/9.1 |

FOREIGN PATENT DOCUMENTS

| JP | 2005-248923 A | 9/2005 |
| JP | 2015-120462 A | 7/2015 |

(Continued)

OTHER PUBLICATIONS

International Search Report (PCT/ISA/210) issued in PCT Application No. PCT/JP2022/003128 dated Apr. 5, 2022 with English translation (4 pages).

(Continued)

*Primary Examiner* — Jeffrey M Shin
(74) *Attorney, Agent, or Firm* — Crowell & Moring LLP

(57) ABSTRACT

A vehicle-mounted control device capable of detecting disconnection failure of a GND line 104 of an electronic control device 100 without adding a circuit and identifying between disconnection failure of the GND line 104 of the electronic control device 100 and disconnection failure of an electric load is realized. The vehicle-mounted control device 100 is supplied with a drive voltage from a voltage source 103 via the GND line 104 and drives a plurality of electric loads. Further, the vehicle-mounted control device 100 includes a voltage monitoring unit 114 that measures a voltage of the voltage source 103 to be supplied to the electric load; a current monitoring unit 114 that measures a current flowing through the electric load; a driving unit 115 that adjusts an energization amount of the electric load; a current cutoff determination unit 201 that determines whether the driving unit 115 cuts off the current flowing through the electric load; and a disconnection identification diagnosis unit 202

(Continued)

that identifies between a disconnection failure of the electric load and a disconnection failure of the GND line 104.

7 Claims, 11 Drawing Sheets

(56) References Cited

FOREIGN PATENT DOCUMENTS

| | | |
|---|---|---|
| JP | 2016-191575 A | 11/2016 |
| JP | 2018-42403 A | 3/2018 |
| JP | 2019-189144 A | 10/2019 |
| WO | WO 2018/110134 A1 | 6/2018 |

OTHER PUBLICATIONS

Japanese-language Written Opinion (PCT/ISA/237) issued in PCT Application No. PCT/JP2022/003128 dated Apr. 5, 2022 with English translation (7 pages).
International Preliminary Report on Patentability (PCT/IB/338 & PCT/IB/373) issued in PCT Application No. PCT/JP2022/003128 dated Dec. 14, 2023, including English translation of Written Opinion (PCT/ISA/237) (6 pages).

* cited by examiner

TABLE 1 'FET OPERATION MODE OF EACH SOL OF THIRD GEAR' AFTER GND LINE DISCONNECTION DETECTION

| SOL | GEAR RATIO THIRD GEAR TARGET CURRENT VALUE [mA] | FET OPERATION MODE AFTER GND DISCONNECTION DETECTION |
|---|---|---|
| SOL A | 600 | PWM |
| SOL B | 0 | FullOpen |
| SOL C | 700 | PWM |
| SOL D | 0 | FullOpen | ns
VEHICLE-MOUNTED CONTROL DEVICE

TECHNICAL FIELD

The present invention relates to diagnosis and fail-safe control of an electric load such as a solenoid in a vehicle-mounted control device.

BACKGROUND ART

A large number of actuators including a motor, a solenoid valve, and the like are mounted on a vehicle-mounted control device for controlling a vehicle. Each actuator is connected to an electronic control device by electric wiring and controls a current flowing to each actuator from the electronic control device when generating a driving force or a braking force of the vehicle.

In such a vehicle-mounted control device, the wiring saving of the electric wiring between the electronic control device and the actuator is advanced due to the increasing demand for miniaturization and cost reduction.

A general actuator includes an electric load such as a solenoid, and a current flowing through the electric load is controlled by a load drive circuit mounted on an electronic control device. In the electric wiring between the electric load and the electronic control device, an output line from the electronic control device side to the electric load and an input line through which a feedback current from the electric load side flows into the electronic control device are both wired to the electronic control device. However, from the viewpoint of cost reduction and wiring saving, the electronic control device is downsized by using only the output line to the electric load for wiring and connecting the input line from the electric load side to an external GND ground point having the same potential as a GND ground point of the electronic control device.

In such a vehicle-mounted control device, when a connection line (so-called GND line) between the electronic control device and the GND ground point is disconnected, a current flows backward to the electric load, and the actuator may operate unintentionally.

PTL 1 describes a technique for detecting disconnection failure of a GND line of an electronic control device by adding a circuit for measuring a current flowing backward in an electric load in order to perform an appropriate process when a reverse current is generated.

CITATION LIST

Patent Literature

PTL 1: JP 2019-189144 A

SUMMARY OF INVENTION

Technical Problem

However, in the technique described in PTL 1, it is necessary to add a circuit that measures a current flowing backward in an electric load, and there is a problem that the circuit becomes complicated and cost increases.

An object of the present invention is to realize a vehicle-mounted control device capable of detecting disconnection failure of a GND line of an electronic control device without adding a circuit and identifying between the disconnection failure of the GND line of the electronic control device and disconnection failure of an electric load.

Solution to Problem

In order to achieve the above object, the present invention is configured as follows.

In a vehicle-mounted control device that is supplied with a drive voltage from a voltage source via a GND line and drives a plurality of electric loads, the device includes a voltage monitoring unit that measures a voltage of the voltage source to be supplied to the electric load; a current monitoring unit that measures a current flowing through the electric load; a driving unit that adjusts an energization amount of the electric load; a current cutoff determination unit that determines whether to cut off the current flowing through the electric load by the driving unit; and a disconnection identification diagnosis unit that identifies between a disconnection failure of the electric load and a disconnection failure of the GND line.

Advantageous Effects of Invention

According to the present invention, it is possible to realize a vehicle-mounted control device capable of detecting a disconnection failure of a GND line of an electronic control device without adding a circuit and identifying between disconnection failure of the GND line of the electronic control device and a disconnection failure of an electric load.

DESCRIPTION OF EMBODIMENTS

Hereinafter, embodiments of the present invention are described with reference to the accompanying drawings.

EXAMPLES

First Embodiment

Figure 1:
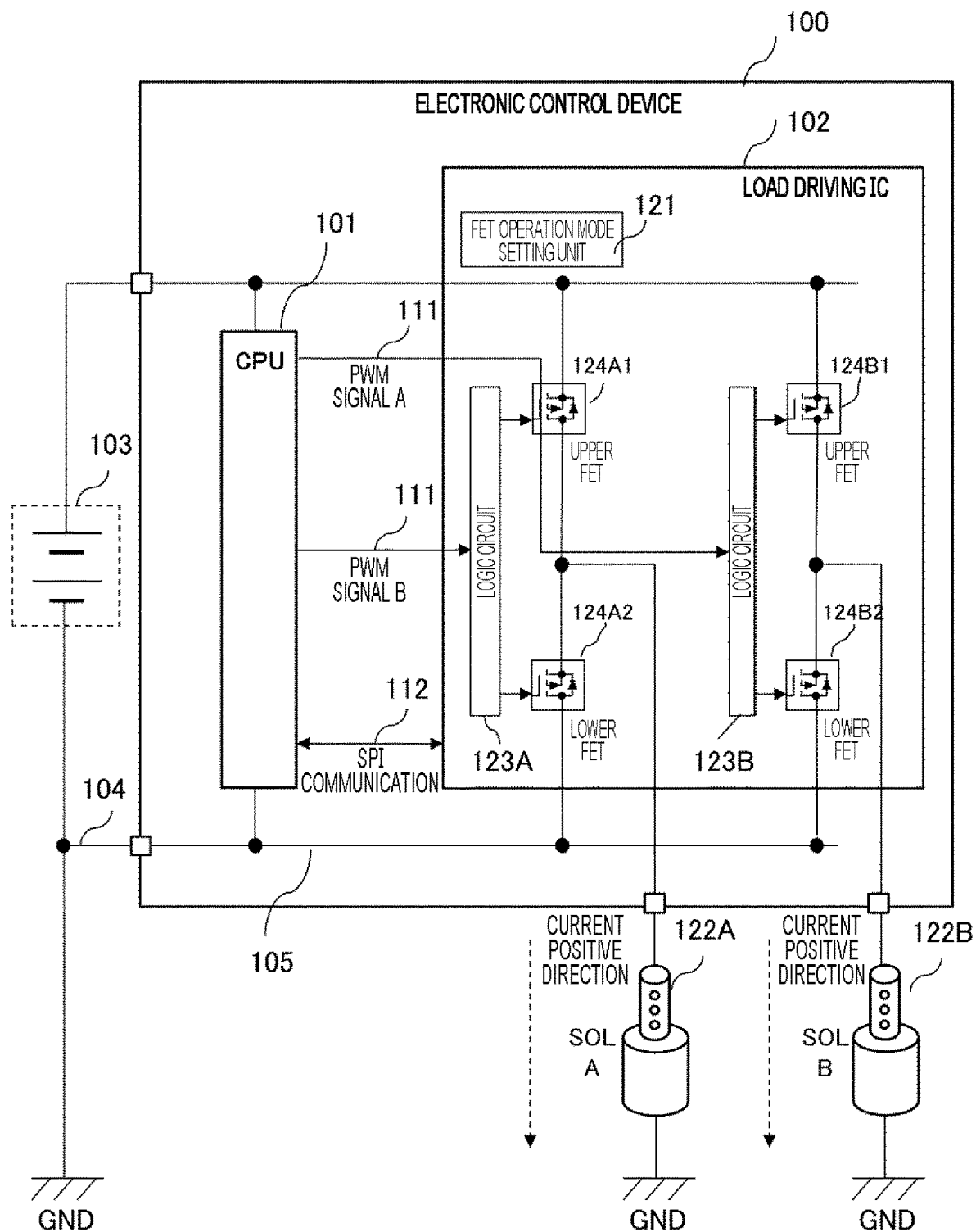
FIG. 1 is a schematic configuration diagram of an electronic control device which is a vehicle-mounted control device according to a first embodiment of the present invention.

FIG. 1 is a schematic configuration diagram of an electronic control device 100 which is a vehicle-mounted control device according to a first embodiment of the present invention.

In FIG. 1, the electronic control device 100 is supplied with driving power from a battery 103 (voltage source) via a GND line 104, and includes a CPU 101, a load driving IC 102, and a battery voltage measuring circuit (not illustrated). The CPU 101 and the load driving IC 102 are connected at the same voltage level as the GND line 104 via a GND 105 (circuit pattern), and a drive voltage is supplied from the battery 103. The CPU 101 outputs the drive voltage supplied from the battery 103 which is a voltage source as a voltage for driving each solenoid (SOL A 122A, SOL B 122B) by a pulse (not illustrated). Each pulse is PWM-controlled in the CPU 101 and is input to logic circuits 123A and 123B of the load driving IC 102 through a PWM signal line 111.

The logic circuits 123A and 123B perform ON/OFF control of upper and lower FETs 124A1, 124A2, 124B1, and 124B2 forming a drive circuit 115 according to the ON/OFF time of the pulse and control the amounts of currents flowing through the solenoids SOL A 122A and SOL B 122B.

The amounts of currents flowing through the solenoids SOL A 122A and SOL B 122B, which are electric loads, are measured by a current measurement circuit 114, which is a current monitoring unit of the load driving IC 102, and is transmitted to the CPU 101 as a monitor current value through a SPI communication 112.

In the first embodiment, it is assumed that the system is a system in which the direction of the current flowing from the load driving IC 102 to the solenoids SOL A 122A and SOL B 122B is a positive direction, the monitor current can be measured with a current value only in the positive direction as a positive current value, and the current value in the negative direction is measured as 0 mA.

Here, the CPU 101 includes a control amount calculation unit 204A (FIG. 2) for controlling the amount of current flowing to each of the solenoids SOL A 122A and SOL B 122B, and the control amount calculation unit 204A determines a duty ratio of a pulse for PWM control from a deviation amount between a current value as a target (so-called target current value) flowing to each of the solenoids SOL A 122A and SOL B 122B and a monitor current value.

In addition, the control amount calculation unit 204A assumes that the pulse period of the PWM control is constant, and the execution period of the control logic and the control calculation described below is the same period as the pulse period of the PWM.

In addition, it is assumed that the monitor current of the first embodiment has a time delay of two PWM control cycles with respect to the actual current value actually flowing.

The load driving IC 102 includes an FET operation mode setting unit 121 and is configured to be able to individually set the operation mode of the FET in the drive circuit 115 of each of the solenoids SOL A 122A and SOL B 122B. As the operation mode of the FET, there are a PWM mode and a FullOpen mode, and the selection of each mode is performed by the CPU 101 changing a setting value of a register (not illustrated) of the FET operation mode setting unit 121 through the SPI communication 112.

When the PWM mode is selected, the FETs 124A1, 124A2, 124B1, and 124B2 at the upper and lower stages of the load driving IC 102 are ON/OFF controlled, and the amount of current flowing through the solenoids SOL A 122A and SOL B 122B is PWM-controlled. Meanwhile, when the FullOpen mode is selected, all of the FETs 124A1, 124A2, 124B1, and 124B2 at the upper and lower stages are turned off, and the path of the current flowing through the solenoids SOL A 122A and SOL B 122B becomes OPEN, so that the current flow is cut off.

In addition, the CPU 101 includes a battery voltage monitoring circuit 113 (voltage monitoring unit) that monitors the voltage of the battery 103 and a voltage value of the battery 103 supplied from the CPU 101 can be acquired as a battery voltage monitor value.

Here, the monitor current of the first embodiment is assumed to hold the monitor current value in the PWM mode when the operation mode of the FETs 124A1, 124A2, 124B1, and 124B2 changes from the PWM mode to Full-Open.

Figure 2:
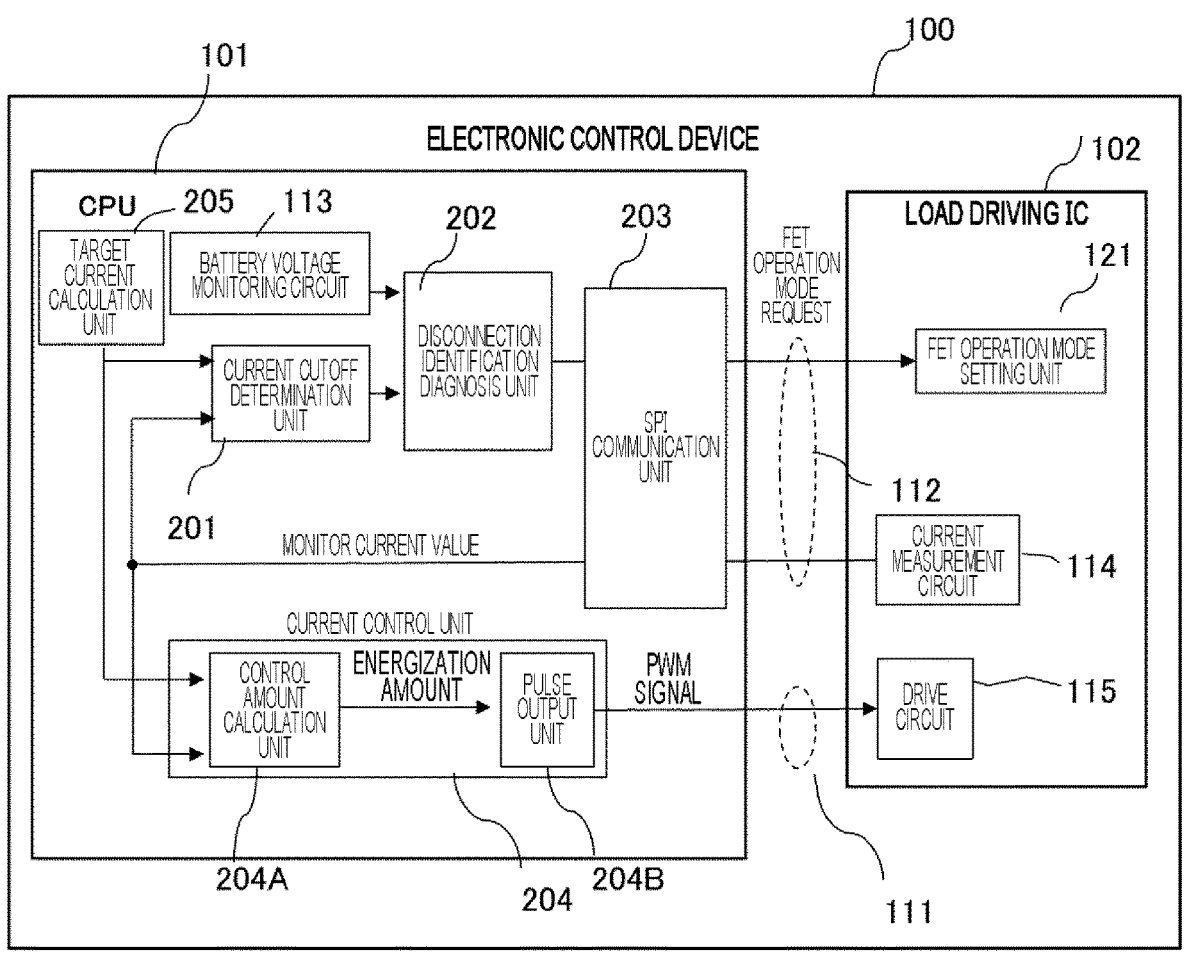
FIG. 2 is a diagram illustrating a functional configuration inside a CPU according to the first embodiment.

FIG. 2 is a diagram illustrating a functional configuration inside the CPU 101 according to the first embodiment. The functional configuration inside the CPU 101 according to the present invention includes a current cutoff determination unit 201, a disconnection identification diagnosis unit 202, an SPI communication unit 203, a current control unit 204, and a target current calculation unit 205, all of which are implemented by software. Other configurations are the same as those of the configuration illustrated in FIG. 1.

In FIG. 2, the current cutoff determination unit 201 has a function of determining whether to cut off the current flowing through the solenoids SOL A 122A and SOL B 122B, which are electric loads, by the drive circuit 115 (driving unit), detecting an abnormal state of the current flowing through the solenoids SOL A 122A and SOL B 122B from the target current value and the monitor current value of the solenoids SOL A 122A and SOL B 122B when the FET operation mode of the solenoids SOL A 122A and SOL B 122B is the PWM mode, and determining that "there is a current cutoff request" when an abnormality is detected. (Details are described below with reference to FIG. 4.)

When the current cutoff determination unit 201 determines that "there is a current cutoff request", the disconnection identification diagnosis unit 202 identifies whether the GND line 104 illustrated in FIG. 1 is disconnected or the load of the load (the solenoid SOL A 122A or SOL B 122B) driven by the load driving IC 102 is disconnected.

An identification method of the disconnection identification diagnosis unit 202 is determining that the GND line 104 is disconnected when the current cutoff determination unit 201 determines that "there is a current cutoff request" and the battery voltage monitor value is a predetermined voltage value or more. When the current cutoff determination unit 201 determines that "there is a current cutoff request" and the voltage value monitored by the battery voltage monitoring circuit 113 is less than the predetermined voltage value, it is determined that the load (SOL A 122A and SOL B 122B) driven by the load driving IC 102 is disconnected.

In this case, when the GND line 104 is disconnected while the solenoids SOL A 122A and SOL B 122B are driven in the PWM mode, the feedback current of one solenoid flows into the GND 105 via the other solenoid, so that the software detects that the battery voltage monitor value monitored by the CPU 101 apparently increases, thereby detecting the disconnection of the GND line 104.

In the case of disconnection of the load (here, the solenoids SOL A 122A and SOL B 122B) driven by the load driving IC 102, the connection between the GND 105 and the GND line 104 of the battery 103 is maintained, and thus the battery voltage monitor value does not increase.

When the disconnection identification diagnosis unit 202 determines that the load (here, the solenoids SOL A 122A and SOL B 122B) driven by the load driving IC 102 is disconnected, the SPI communication unit 203 sets the FET operation mode setting unit 121 through the SPI communication 112 so that the FET operation mode of the solenoid determined to be disconnected becomes the FullOpen mode.

Meanwhile, when the disconnection identification diagnosis unit 202 determines that the GND line 104 is disconnected, the FET operation mode of all the solenoids SOL A 122A and SOL B 122B is set to the FullOpen mode.

The current control unit 204 includes the control amount calculation unit 204A for controlling the amount of current flowing through the solenoids SOL A 122A and SOL B 122B, and the control amount calculation unit 204A determines the energization amount (so-called duty ratio) of the pulse of the PWM signal for PWM control from the deviation amount of the current between the monitor current value and the target current value calculated by the target current calculation unit 205. A pulse output unit 204B generates a pulse based on the duty ratio calculated by the control amount calculation unit 204A and outputs the pulse to the drive circuit 115 (driving unit that adjusts the energization amount of the electric load) which is the logic circuit unit of the load driving IC 102 through the PWM signal line 111.

With the above functional configuration, it is identified whether the disconnection failure of the GND line 104 illustrated in FIG. 1 or the disconnection failure of the load driven by the load driving IC 102. As a result, when the disconnection failure of the load (the solenoids SOL A 122A and SOL B 122B) driven by the load driving IC 102 is determined, driving of only the solenoid that is the disconnected load is stopped, and the control of the solenoid that is the normal load is continued to maintain the control of the vehicle. Further, when the disconnection failure of the GND 104 is determined, higher safety can be secured by stopping driving of all solenoids SOL A 122A and SOL B 122B.

Figure 3:
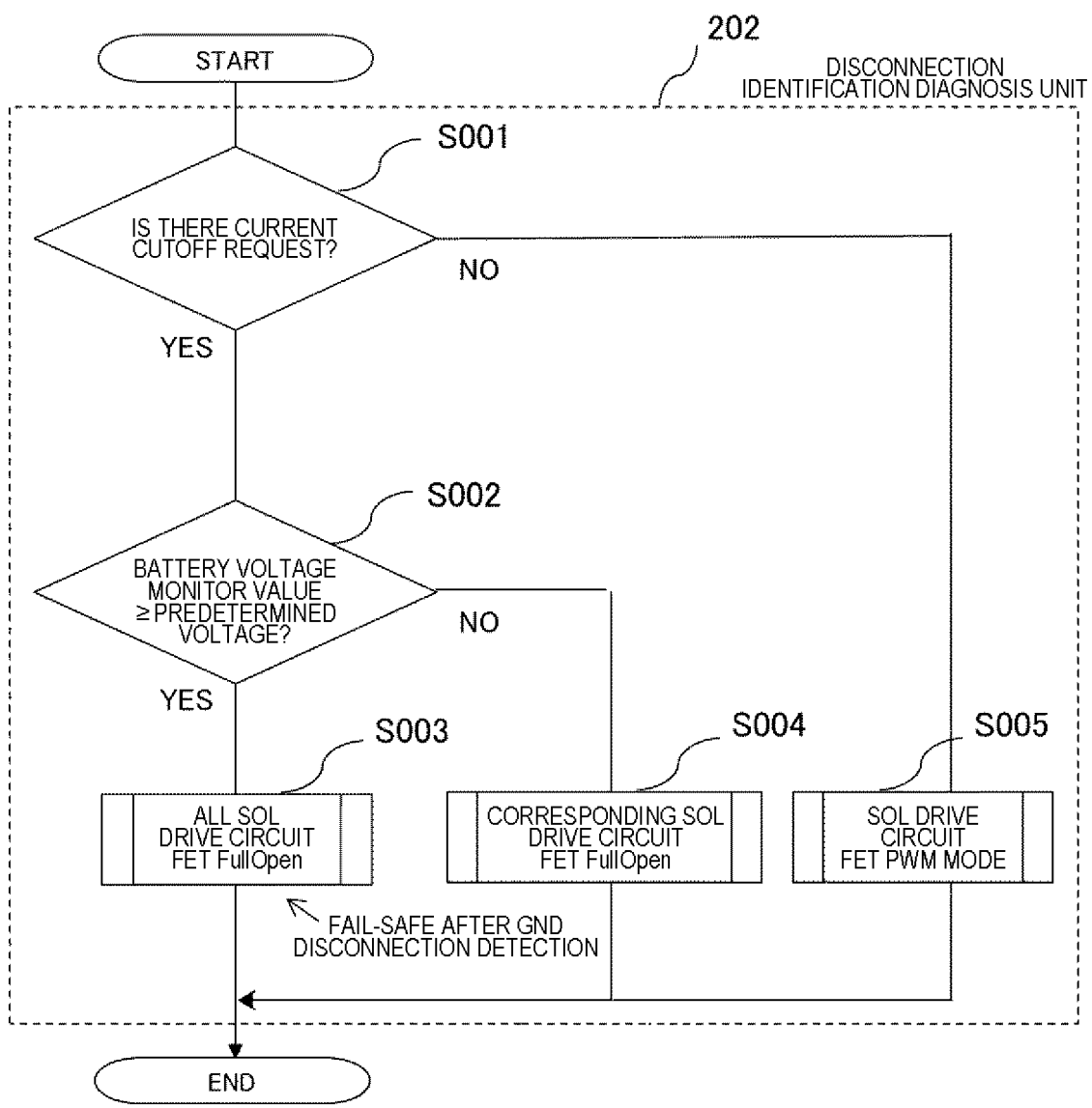
FIG. 3 is a flowchart illustrating details of a software logic of a disconnection identification diagnosis unit.

FIG. 3 is a flowchart illustrating details of a software logic of the disconnection identification diagnosis unit 202.

The software process based on the logic according to the first embodiment is repeatedly executed in each pulse period of the PWM control.

In FIG. 3, in step S001, it is determined whether there is a current cutoff request. When there is a current cutoff request (YES), the process proceeds to step S002. In step S001, when there is not a current cutoff request (No), the process proceeds to step S005, the drive circuit 115 of the solenoid is set to the PWM mode, the process is ended, and the process proceeds to END. Note that the determination in step S001 as to whether there is a current cutoff request is performed by the software logic inside the current cutoff determination unit 201, and details are described below with reference to FIG. 4.

In step S002, it is determined whether the battery voltage monitor value monitored by the battery voltage monitoring circuit 113 is a predetermined voltage or more. In step S002, when the battery voltage monitor value is the predetermined voltage value or more (YES), the process proceeds to step S003. In step S002, when the battery voltage monitor value is less than the predetermined voltage value (NO), the process proceeds to step S004.

In step S003, when it is determined in step S002 that the battery voltage monitor value is the predetermined voltage or more, it is determined that the GND line 104 is disconnected, and the FET operation mode of all the solenoids SOL A 122A and SOL B 122B is set to the FullOpen mode through the SPI communication unit 112.

In step S004, when it is determined in step S002 that the battery voltage monitor value is less than the predetermined voltage, it is determined that the load (the solenoids SOL A 122A and SOL B 122B) driven by the load driving IC 102 is disconnected, the FET operation mode of the solenoid determined to be disconnected is set to the FullOpen mode through the SPI communication 112, and the current is cut off.

The software logic of the disconnection identification diagnosis unit 202 is configured by the above processing flow.

A determination threshold of the battery voltage monitor value shown in step S002 is set from an operable voltage value of the load driving IC 102.

Figure 4:
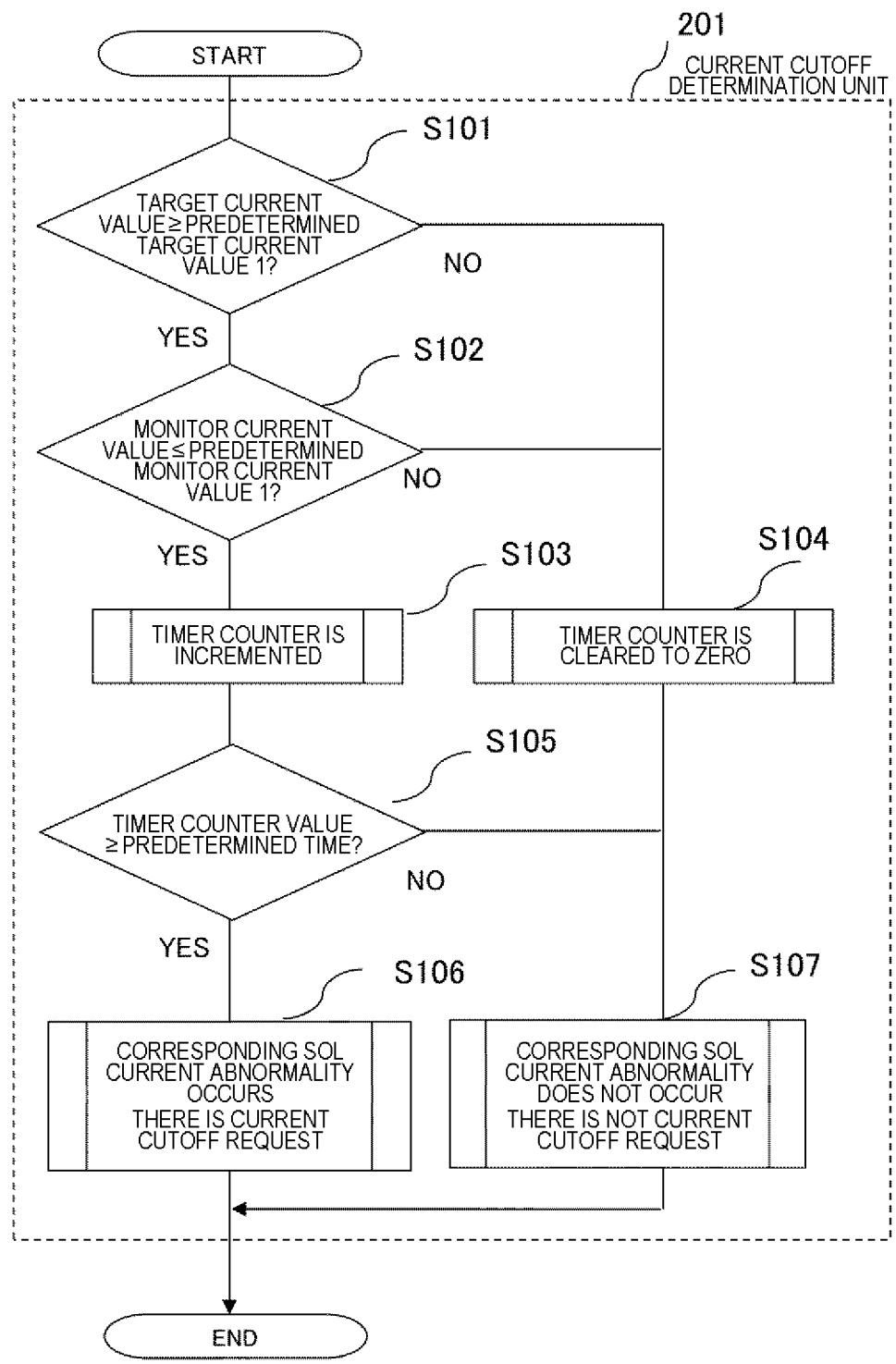
FIG. 4 is a flowchart illustrating details of a software logic of a current cutoff determination unit illustrated in FIG. 2.

FIG. 4 is a flowchart illustrating details of a software logic of the current cutoff determination unit 201 illustrated in FIG. 2.

In step S101 of FIG. 4, it is determined whether the target current value is a predetermined target current value 1 or more. In a case where the target current value is the predetermined target current value 1 or more (YES), the process proceeds to step S102. In step S101, when the target current value is less than the predetermined target current value 1 (NO), the process proceeds to step S104, and a timer counter is cleared to zero.

In step S102, it is determined whether the monitor current of the solenoid is a predetermined monitor current value or less.

In step S102, in a case where the monitor current is the predetermined monitor current value or less (YES), the timer counter is incremented in step S103, and the process proceeds to step S105. In step S102, in a case where the monitor current is less than the predetermined monitor current value (NO), the timer counter is cleared to zero in step S104, and the process proceeds to step S107.

In step S105, it is determined whether the timer counter value is a predetermined time or more. When the timer count value is the predetermined time or more (YES) in step S105, it is considered that the current abnormality occurs in the solenoid in step S106, and it is determined that "there is a current cutoff request". The determination as to whether the timer count value is the predetermined time or more in step S105 is determination as to whether the time until the current value is stabilized has elapsed. When it is determined in step S105 that the timer count value is not the predetermined time or more (NO), the process proceeds to step S107.

In step S107, it is determined that there is no current abnormality in the solenoid and "there is no current cutoff request".

The software logic of the current cutoff determination unit 201 is configured by the above processing flow.

The predetermined target current value 1 is set to a value sufficiently larger than the predetermined monitor current value 1 in consideration of measurement variations of the monitor current value. The predetermined monitor current value 1 is set to 0 [mA] because the monitor current becomes 0 [mA] due to disconnection.

Figure 5A:
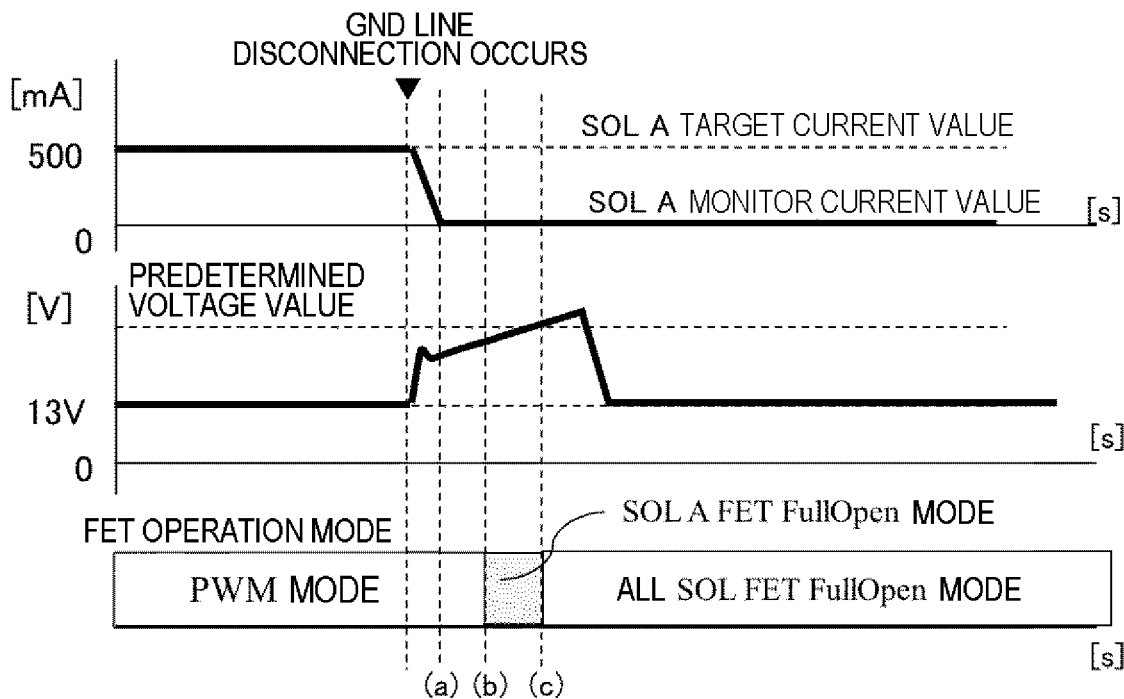
FIG. 5A is a time chart of a monitor current, a battery voltage monitor value, and an FET operation mode of a load when disconnection occurs from a state where the load is normally controlled.

FIG. 5A is a time chart of the monitor current, the battery voltage monitor value, and the FET operation mode of the solenoid SOL A 122A when the disconnection occurs at the disconnection occurrence timing in FIG. 5A from the state where the solenoids SOL A 122A and SOL B 122B are normally controlled in the functional configurations of FIGS. 1 to 4 described above. In FIG. 5A, the solenoid SOL A 122A is simply referred to as an SOL A (the same applies to FIG. 5B described below).

Figure 5B:
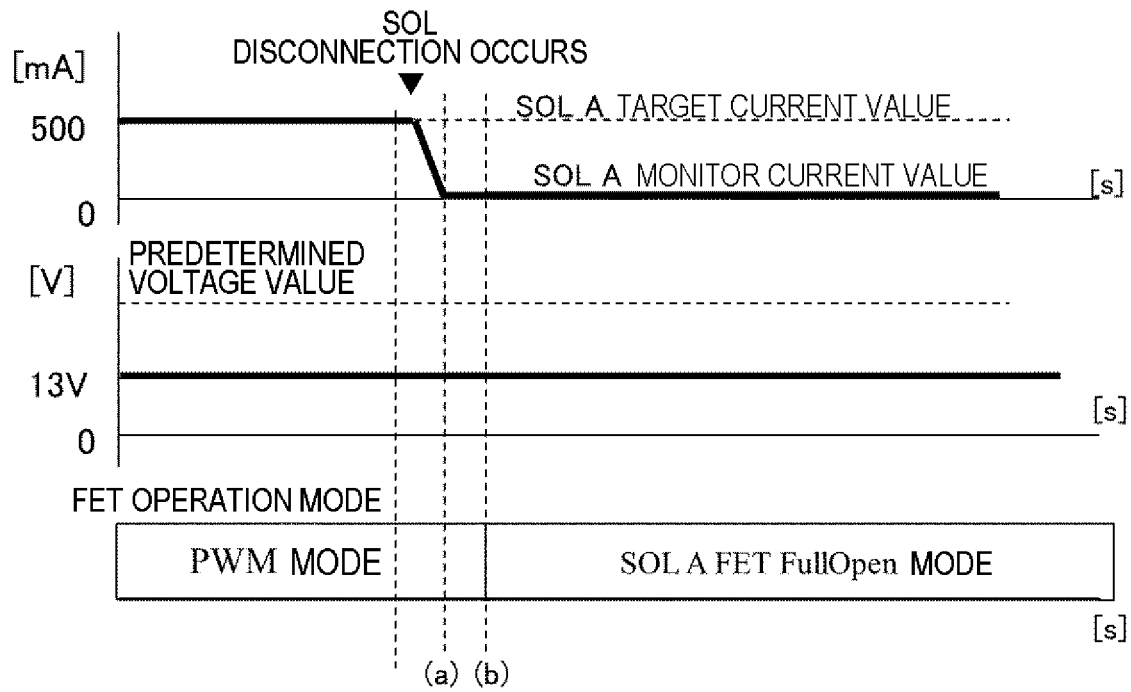
FIG. 5B is a time chart in a case where disconnection of a load driven by a load driving IC occurs.

Here, FIG. 5A illustrates a time chart when the disconnection of the GND line 104 in the configuration of FIG. 1 occurs, and FIG. 5B illustrates a time chart when the disconnection of the solenoid SOL A 122A, which is the load driven by the load driving IC 102, occurs.

In FIG. 5A, when disconnection of the GND line 104 occurs at the disconnection occurrence timing in FIG. 5A in a state in which the SOL A 122 A is controlled in the PWM mode with the target current of 500 [mA], the feedback current flowing through the solenoid SOL B 122B flows into the GND 105 via the solenoid SOL A 122A (not illustrated).

Since the monitor current of the first embodiment is measured with the current value in the negative direction set to 0 mA, the monitor current (solid line) of the solenoid SOL A 122A becomes 0 mA at the timing of (a). After the predetermined time has elapsed, the FET operation mode of the solenoid SOL A 122A is set to the FullOpen mode at the timing of (b).

When the GND disconnection occurs, the battery voltage monitor value apparently rises, the GND disconnection is determined at the timing of (c) when the voltage becomes the predetermined voltage or more, the FET operation mode of all the solenoids SOL A 122A and SOL B 122B is set to the FullOpen mode, and the driving is stopped.

Next, FIG. 5B is described. When disconnection of the solenoid SOL A 122A as a load occurs at the disconnection occurrence timing in FIG. 5B in a state where the solenoid SOL A 122A is controlled at the target current of 500 mA in the PWM mode, no current flows through the solenoid SOL A 122A, and thus, the monitor current value becomes 0 mA at the timing of (a).

The FET operation mode of the solenoid SOL A 122A is set to the FullOpen mode at the timing of (b) after the predetermined time has elapsed. In the case of disconnection of the solenoid SOL A 122A as the load, the connection between the GND 105 and the battery 103 is maintained, and thus the battery voltage monitor value does not increase.

Therefore, the disconnection identification diagnosis unit 202 determines that the SOL A 122A as a load driven by the load driving IC 102 is disconnected and sets the FET operation mode of the SOL A determined to be disconnected to the FullOpen mode by the SPI communication units 23A and 1123B to stop the driving.

A method of identifying the disconnection failure of the load driven by the load driving IC 102 and the failure of the GND disconnection and stopping the driving of the solenoid when the disconnection occurs is described above.

In the first embodiment, the driving of all the solenoids SOL A 122A and SOL B 122B is stopped after the failure of the GND disconnection is detected, but the scope of the present invention is not limited to this case and includes a method of stopping the driving of only a specific solenoid. In a next modification of the first embodiment, a fail-safe control when a failure of a GND disconnection is detected by an electronic control device of a vehicle transmission is described.

The transmission of the first embodiment includes a plurality of solenoids, and the pressure of the oil flowing in the transmission is adjusted by controlling the current of each solenoid to change the gear ratio. Therefore, the gear ratio is determined by the amount of current flowing through each solenoid. For example, in a transmission having four solenoids SOL A, SOL B, SOL C, and SOL D related to shifting, when the vehicle travels with the gear stage in a third gear, the currents of the four solenoids SOL A, SOL B, SOL C, and SOL D are controlled to be predetermined currents.

Figures 6A, 6B:
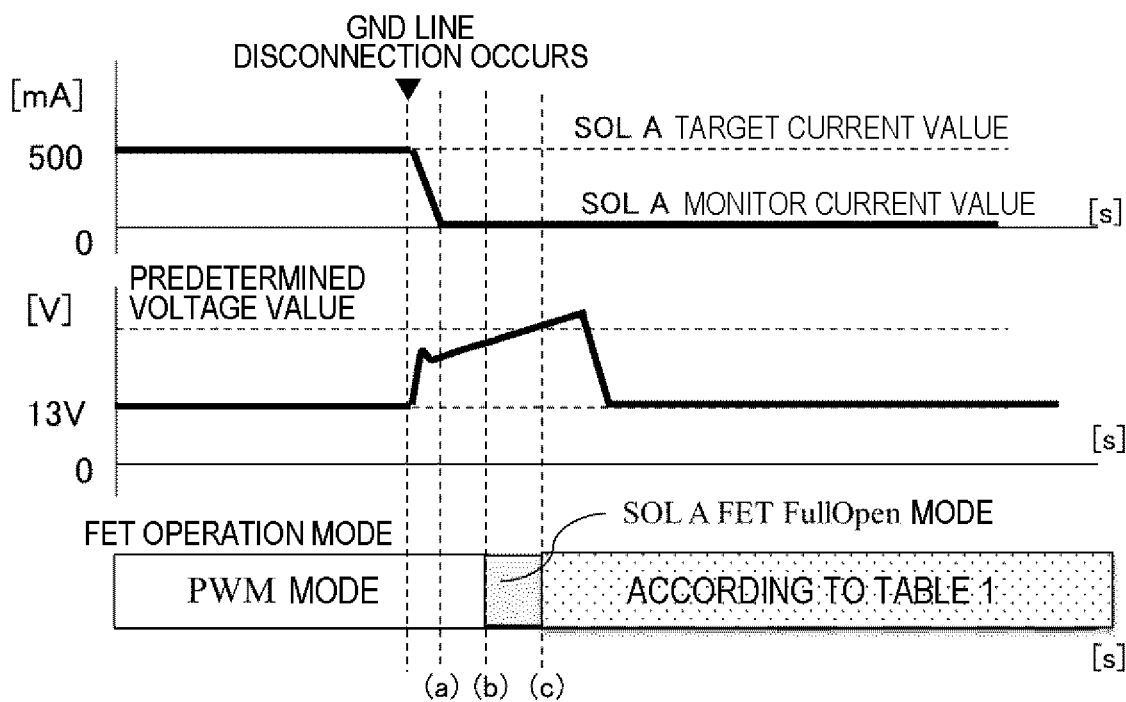
FIG. 6A is a diagram illustrating an example in which a fail-safe is performed to fix a gear ratio to a third gear, in a case where a failure of a GND disconnection is detected by the electronic control device of a transmission.
FIG. 6B is a diagram illustrating an example in which a fail-safe is performed to fix the gear ratio to the third gear, in a case where a failure of the GND disconnection is detected by the electronic control device of the transmission.

FIGS. 6B and 6B illustrate an example in which a fail-safe is performed to fix the gear ratio to the third gear, in a case where a failure of the GND disconnection is detected by the electronic control device of the transmission.

The transmission (not illustrated) according to the first embodiment includes four solenoids, that is, solenoids SOL A, SOL B, SOL C, and SOL D. In a case where the gear stage is set to the third gear, as illustrated in Table 1 in FIG. 6B, the transmission is a system in which a current of 600 [mA] flows through the solenoid SOL A, a current of 0 [mA] flows through the solenoid SOL B, a current of 700 [mA] flows through the solenoid SOL C, and a current of 0 [mA] flows through the solenoid SOL D. Fail safe control after failure detection of GND disconnection is described below.

FIG. 6A illustrates a time chart of the monitor current, the battery voltage monitor value, and the FET operation mode of the solenoid SOL A when the GND disconnection occurs at the disconnection occurrence timing in FIG. 6A from the state where the solenoid SOL A is normally controlled. The monitor current, the battery voltage monitor value, and the behavior of the solenoid SOL A are the same as those in the case illustrated in FIG. 5A but are different in that the setting of the FET operation mode of each solenoid after the GND disconnection is determined at the timing of (c) is set in accordance with the currents of the solenoids SOL A, SOL B, SOL C, and SOL D at the third gear shown in Table 1 in FIG. 6B.

In order to prevent that the current cannot be controlled at 0 [mA] (the solenoid cannot be turned off) due to the occurrence of the reverse flow of the current of the solenoid when the disconnection of the GND line 104 occurs, the FET drive mode of the solenoid in which the current becomes 0 [mA] (OFF) at the third gear is set to the FullOpen mode, so that the current flow is forcibly cut off to 0 [mA] (OFF).

The electronic control device 100 according to the modification of the first embodiment has the same configuration as that described above except that only the fail-safe process after the GND disconnection is detected illustrated in step S003 of FIG. 3 is changed so that the FET drive mode of the solenoid in which the current is 0 [mA] (OFF) at the third gear is set to the FullOpen mode.

With such control, when a failure of the GND disconnection is detected, the fail-safe is performed such that the gear stage is set to the third gear, and the vehicle can be moved to a safe place.

As described above, according to the first embodiment of the present invention, when the abnormality of the load current detected by the load current driving IC 102 is detected by the CPU 101 in the current control device 100, it is determined from the monitored value of the battery voltage whether it is the disconnection failure of the GND line or the disconnection failure of the solenoid that is the electric load. Therefore, it is possible to realize the vehicle-mounted control device capable of detecting the disconnection failure of the GND line of the electronic control device and identifying between the disconnection failure of the GND line of the electronic control device and the disconnection failure of the electric load without adding a circuit.

Further, according to the first embodiment of the present invention, when a failure of the GND disconnection is detected, the fail-safe is performed such that the gear stage is fixed to the third gear, and thus the effect that the vehicle can be moved to a safe place can be obtained.

Second Embodiment

Next, a second embodiment of the present invention is described.

The second embodiment is an example in which the occurrence of a reverse flow of the current flowing through the load driven by the load driving IC 102 is suppressed by performing current cutoff in advance before the disconnection is detected. The overall configuration of the electronic control device 100 according to the second embodiment is similar to the configuration illustrated in FIGS. 1 and 2 according to the first embodiment, and thus is not illustrated.

Figure 7:
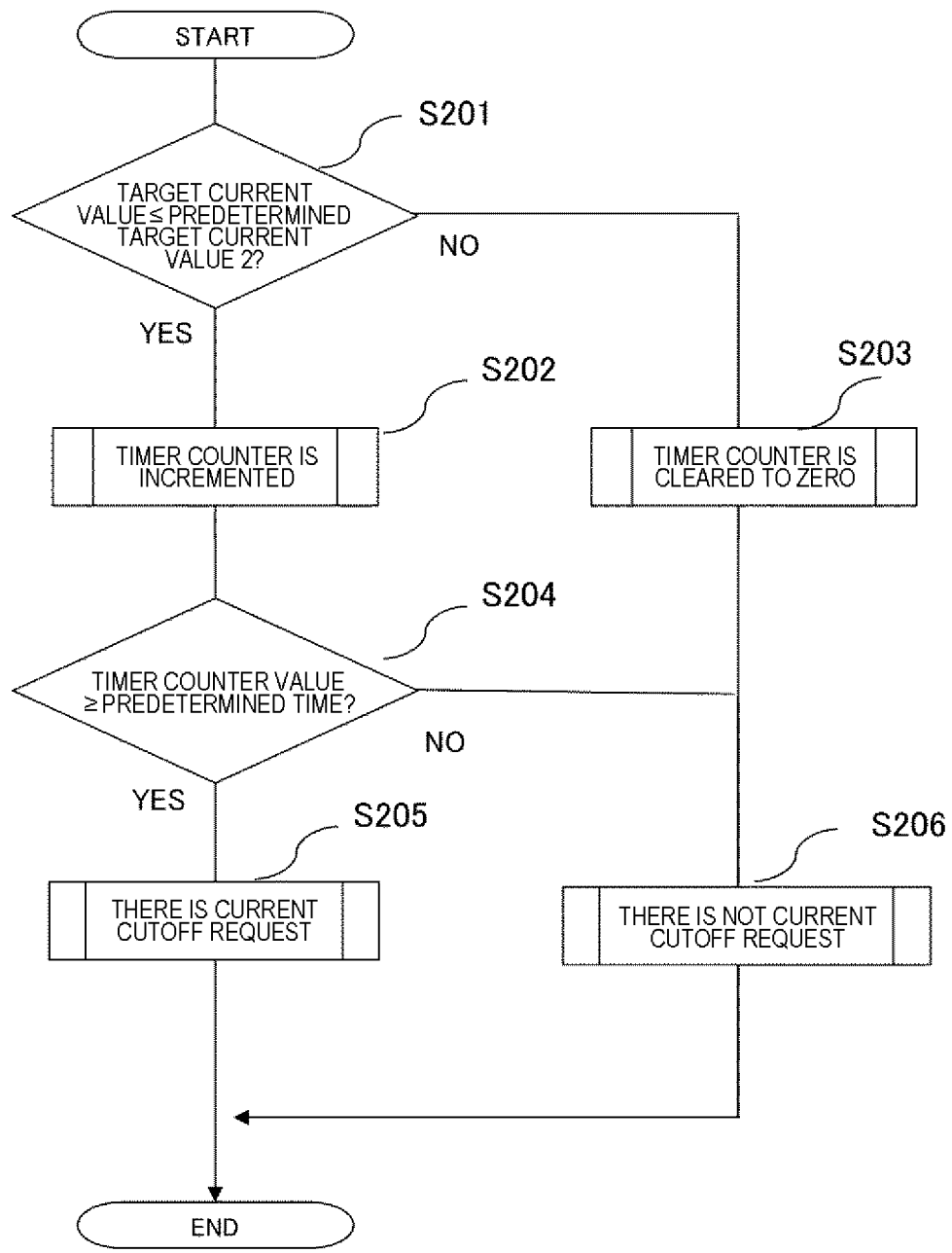
FIG. 7 is a flowchart illustrating a logic for measuring an elapsed time when a target current value is equal to or less than a predetermined target current value and determining that there is a current cutoff request when a predetermined time has elapsed in a second embodiment.

FIG. 7 is a flowchart illustrating a logic for measuring an elapsed time when a target current value is a predetermined target current value 2 or less and determining that there is a current cutoff request when a predetermined time has elapsed in the second embodiment.

In the second embodiment, software of the logic illustrated in FIG. 7 is mounted on the logic of the current cutoff determination unit 201 described in FIG. 4, and it is determined whether there is a current cutoff request.

In step S201 of FIG. 7, it is determined whether the target current value is the predetermined target current value 2 or less. In a case where the target current value is the predetermined target current value 2 or less (YES), the process proceeds to step S202. In step S201, when the target voltage value is greater than the predetermined target current value 2 (NO), the process proceeds to step S203.

When the process proceeds to step S202, the timer counter is incremented, and the process proceeds to step S204. In step S203, the timer counter is cleared to zero, and the process proceeds to step S206.

In step S204, it is determined whether the timer counter value is a predetermined time or more. In step S204, when the timer counter value is less than the predetermined time (NO), the process proceeds to step S206, and it is determined that there is no current cutoff request. In step S204, when the timer counter value is the predetermined time or more (YES), the process proceeds to step S205, it is determined that there is a current cutoff request, and the FET drive mode of the solenoid is set to the FullOpen mode.

Here, the predetermined target current value 2 is set to 0 [mA]. In order to prevent that the current cannot be controlled to 0 [mA] (the solenoid cannot be turned off) due to the occurrence of the reverse flow of the current of the solenoid when the disconnection of the GND line 104 occurs, the FET drive mode of the solenoid when the predetermined target current becomes 0 [mA] (OFF) is set to the FullOpen mode, so that the current flow is forcibly cut off to 0 [mA] (OFF).

Figure 8:
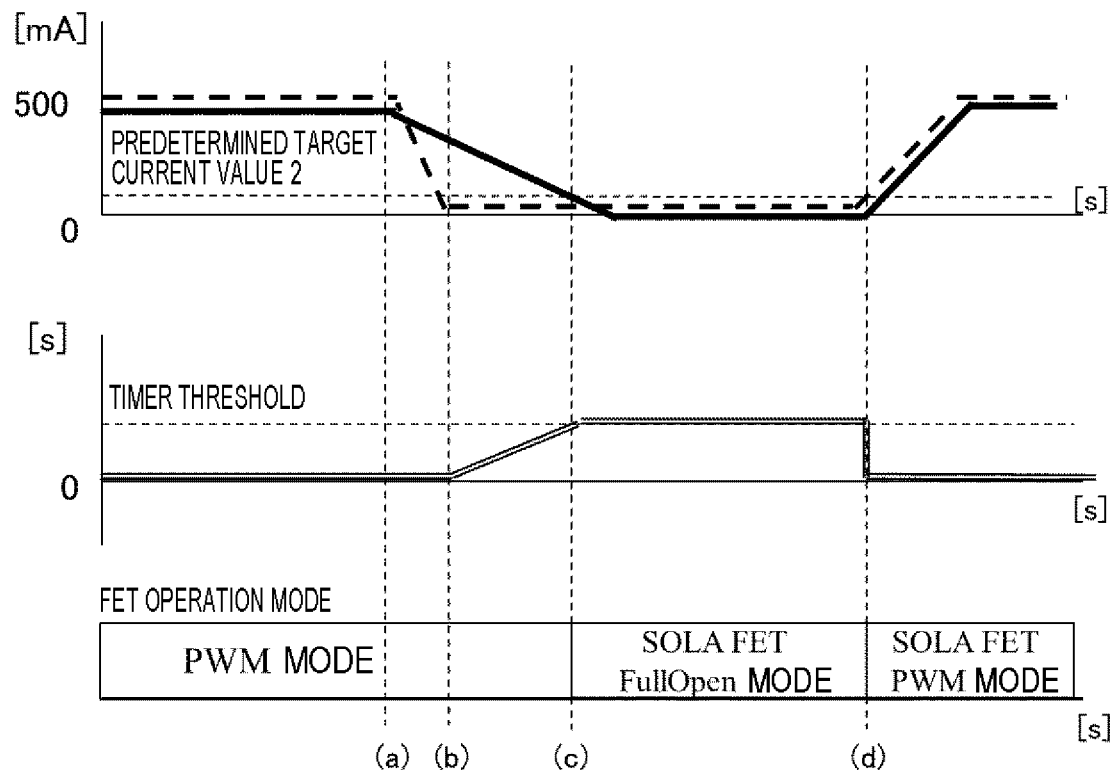
FIG. 8 is an explanatory diagram of a current cutoff logic in a case where software of the logic illustrated in FIG. 7 is executed.

FIG. 8 is an explanatory diagram of a current cutoff logic in a case where software of the logic illustrated in FIG. 7 described above is executed.

In FIG. 8, the target current starts to decrease to 0 [mA] at the timing of (a) from the state in which the PWM control is performed at the target current 500 [mA] of the solenoid SOL A 122A. At this time, when the target current value becomes the predetermined target current value 2 or less (set to 0 [mA]) at the timing (b), the timer counter increments. Next, when the timer counter value becomes the timer threshold value (set to 10 [ms]) or more at the timing of (c), the FET operation mode of the solenoid SOL A 122A is changed from the PWM mode to the FullOpen mode, and the current is cut off.

In addition, when the target current is returned to 500 [mA] at the timing of (d), the FET operation mode is switched from the FullOpen mode to the PWM mode, whereby the current control is resumed.

By performing the operation control as described above, when the current OFF is requested (when the target current is requested to be 0 [mA]), it is determined whether there is a current cutoff request of the target solenoid out of the solenoid SOL A 122A or the SOL B 122B regardless of the monitor current value, so that the FET operation mode of the corresponding solenoid is set to the FullOpen mode.

As a result, when the upper and lower FETs 124A1, 124A2, 124B1, and 124B2 in FIG. 1 open, the current value becomes 0 [mA], and the reverse flow of the current can be prevented regardless of the occurrence of the disconnection.

In addition, since the determination timing of the current cutoff request can be changed by setting the timer threshold, the current cutoff timing can be adjusted according to the output responsiveness of the load (here, the solenoids SOL A 122A and SOL B 122B) driven by the load driving IC 102.

Next, in the second embodiment of the present invention, a control amount calculation method in the current control unit 204 when the FET operation mode of the solenoid as a load returns from the FullOpen mode to the PWM mode is described.

As described above, it is assumed that the monitor current of the second embodiment has a time delay of two PWM control cycles with respect to the actual current value actually flowing. In addition, the monitor current of the second embodiment is configured to hold the monitor current value in the PWM mode when the operation mode of the FETs 124A1, 124A2, 124B1, and 124B2 changes from the PWM mode to FullOpen.

From these points, when the current control is performed with the above-described configuration, it is likely that the update of the monitor current is delayed and the current control becomes unstable when the FET operation mode returns from the FullOpen mode to the PWM mode.

A technique for suppressing unstable current control is described with reference to FIGS. 9A and 9B.

Figure 9A:
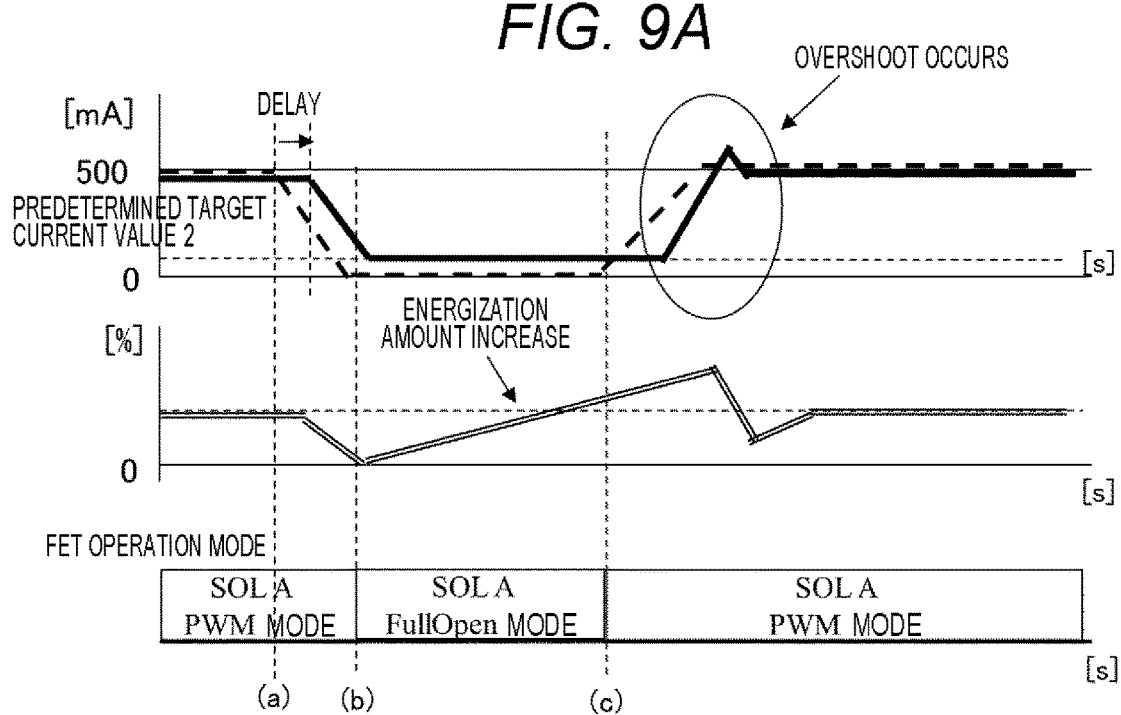
FIG. 9A is a time chart illustrating the amount of current of a solenoid, an energization amount, and an FET operation mode when a measure for suppressing the current control from becoming unstable is implemented.
Figure 9B:
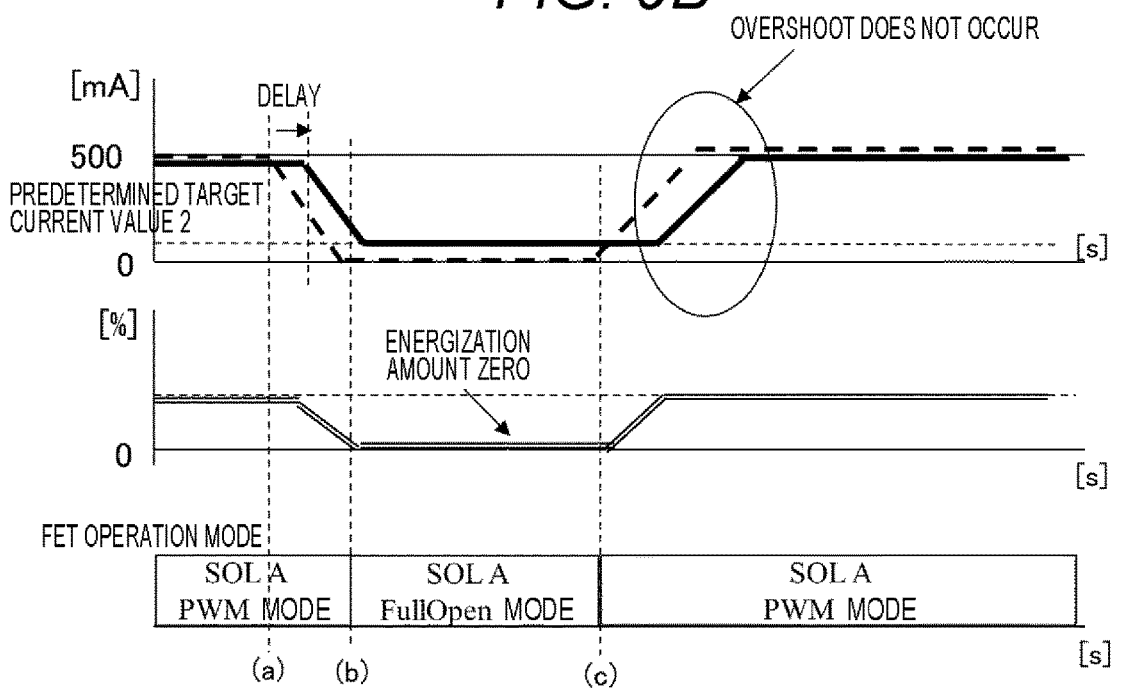
FIG. 9B is a time chart illustrating the amount of current of a solenoid, an energization amount, and an FET operation mode when the measure for suppressing the current control from becoming unstable is implemented.

FIGS. 9A and 9B are time charts illustrating the amount of current of the solenoid SOL A 122A, an energization amount (Duty ratio), and an FET operation mode when the measure for suppressing the current control from becoming unstable is implemented.

First, description is made with reference to FIG. 9A.

In a state where the solenoid SOL A 122A is controlled in the PWM mode with the target current of 500 [mA], the operation of reducing the target current to 0 [mA] is started at the timing of (a). At this time, the monitor current starts decreasing with a delay of at least two PWM control cycles.

Next, at the timing of (b), the target current value becomes the predetermined target current value 2 (set to 0 [mA]) or less, and the FET operation mode of the solenoid SOL A 122A changes from the PWM mode to the FullOpen mode. At this time, the monitor current is held at a value of 0 [mA] or more. In this state, since the control amount calculation unit 204A of the current control unit 204 in FIG. 2 calculates the energization amount (duty ratio) of the pulse for PWM control from the deviation amount of the current between the monitor current value and the target current value, the energization amount calculated in the periods from (b) to (c) increases.

When the target current is set again to 500 [mA] at the timing of (c), the control is started from the increased energization amount, and thus an overshoot occurs in the current response. As a result, current control performance is likely to be deteriorated.

Therefore, in the second embodiment, when it is determined that "there is a current cutoff request" in the current cutoff request determination determined by the current cutoff determination unit 201 in FIG. 2, the deviation amount of the current of the control amount calculation unit 204A and the energization amount of the solenoid SOL A 122A are set to the minimum energization amount (for example, the duty ratio of 0%.).

FIG. 9B is a time chart illustrating behavior in a case where the second embodiment is performed. In FIG. 9B, the deviation amount of the current of the control amount calculation unit 204A and the energization amount of the solenoid SOL A 122A in the period from the time point (b) to (c) are set to the minimum energization amount (for example, the duty ratio of 0%). As a result, since the control is started from the minimum energization amount when the current control is resumed at the timing of (c), the control can be performed without causing an overshoot in the current response.

With the above-described configuration, it is possible to stabilize the control of the current when the solenoid SOL A 122A returns from the FullOpen mode to the PWM control mode.

According to the second embodiment, it is possible to obtain the same effects as those of the first embodiment, and it is possible to suppress the occurrence of a reverse flow of the current flowing to the load driven by the load driving IC 102, and to perform more stable current control.

Third Embodiment

Next, a third embodiment of the present invention is described. The third embodiment is a proposal for an example in which erroneous determination in the current cutoff determination unit 201 can be prevented.

In the third embodiment, when the terminal of the solenoid SOL A 122A and the terminal voltage of the solenoid SOL B 122B illustrated in FIG. 1 are short-circuited with the voltage line of the battery 103 (when a so-called short-circuit failure occurs), an event occurs in which the current flowing through the terminal of the solenoid SOL A 122A and the solenoid SOL B 122B via the lower FETs 124A1 and 124B2 of the load driving IC 102 flows into the load driving IC 102.

As a function of detecting the above event, the load driving IC 102 has a short-circuit detection function. However, since the monitor current becomes 0 mA at the time of short-circuit, the current cutoff determination unit 201 may determine that "there is a current cutoff request", and the disconnection identification diagnosis unit 202 may determine that the load (the solenoids SOL A 122A and SOL B 122B) driven by the load driving IC 102 is disconnected.

Therefore, in the third embodiment, the current cutoff determination unit 201 determines whether there is the short-circuit information from the load driving IC 102, and when there is short-circuit information, the current cutoff determination is not performed (the current cutoff determination is stopped).

Figure 10:
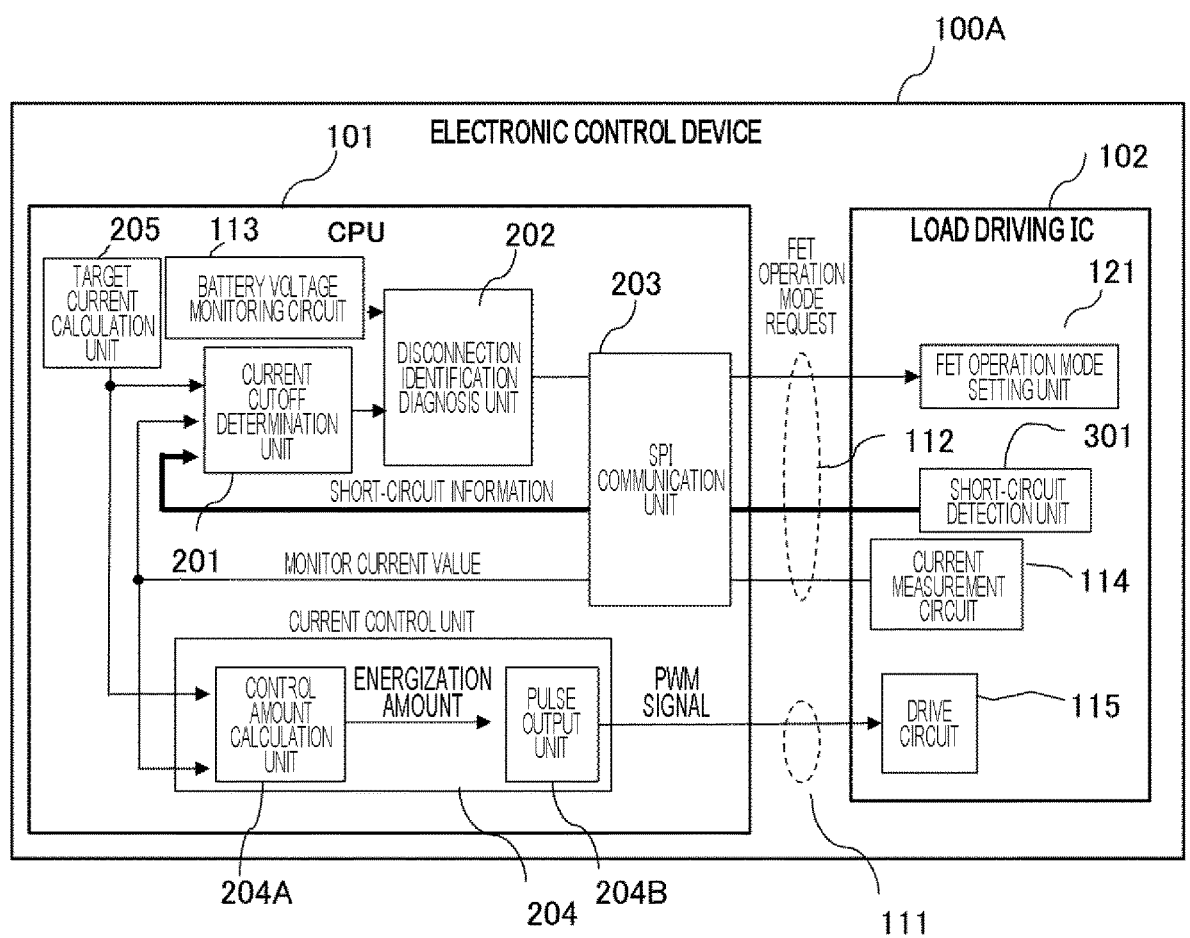
FIG. 10 is a schematic configuration diagram of an electronic control device which is a vehicle-mounted control device according to a third embodiment.

FIG. 10 is a schematic configuration diagram of an electronic control device 100A which is a vehicle-mounted control device according to the third embodiment.

In the electronic control device 100A illustrated in FIG. 10, a short-circuit detection unit 301 is added to the load driving IC 102, and the current cutoff determination unit 201 refers to the short-circuit information, in addition to the functional configuration of the electronic control device 100 of the first embodiment illustrated in FIG. 2. Other configurations of the electronic control device 100A are similar to those of the electronic control device 100 illustrated in FIG. 2.

The short-circuit detection unit 301 has a function of detecting a state in which the terminal of the solenoid SOL A 122A and the terminal of the solenoid SOL B 122B in FIG. 1 are short-circuited to the voltage line of the battery 103. In this function, a short-circuit state is detected by hardware, and information on the presence or absence of a short-circuit is configured to be transmitted to the CPU 101 through SPI communication 112.

The current cutoff determination unit 201 is configured to perform a current cutoff determination process (software logic illustrated in FIG. 11) from the information on the presence or absence of a short-circuit received from the short-circuit detection unit 301.

Figure 11:
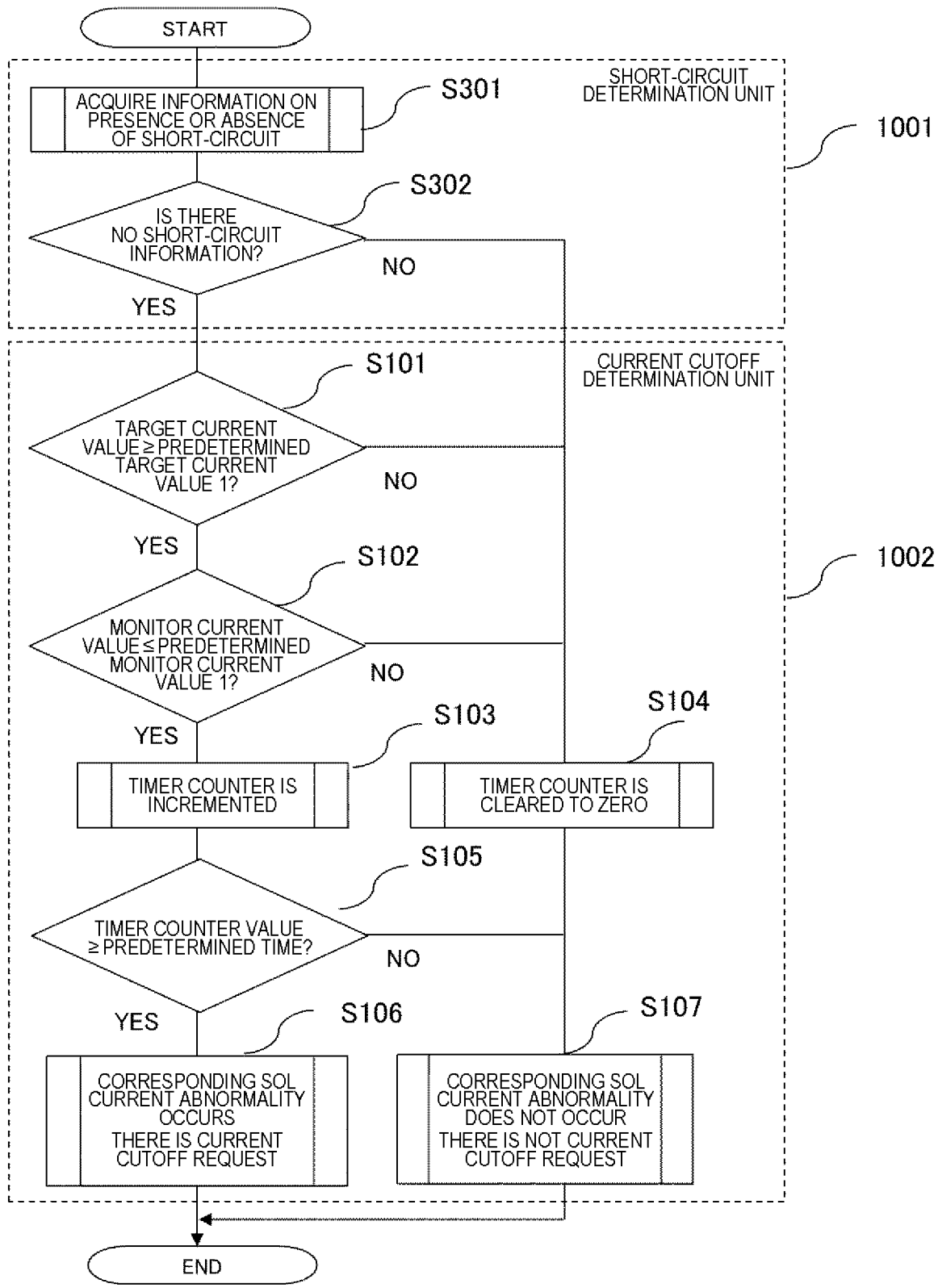
FIG. 11 is a flowchart illustrating details of software logic in the third embodiment.

FIG. 11 is a flowchart illustrating details of the software logic in the third embodiment.

The software logic of the third embodiment includes logics 1001 and 1002, and a logic of a current diagnosis determination unit 201 illustrated in FIG. 4 corresponds to the logic 1002.

Therefore, the software logic of the third embodiment is obtained by adding the logic 1001 of a short-circuit determination unit that processes the short-circuit information from the short-circuit detection unit 301 to the logic 1002 of the first embodiment.

In FIG. 11, the information on the presence of absence of short-circuit information from the short-circuit detection unit 301 received from the SPI communication unit 203 in step S301 is acquired, and the process proceeds to step S302.

In step S302, it is determined whether there is no short-circuit information. When there is no short-circuit information (YES), the process proceeds to step S101.

In step S302, when there is short-circuit information (NO), the process proceeds to step S104, and the timer counter is cleared to aero.

The processing of step S101 and subsequent steps is the same as the processing of the current cutoff determination unit 201 described with reference to FIG. 4.

With the process illustrated in FIG. 11, it is determined that "there is no current cutoff request" by the process of clearing the timer counter to zero in the logic 1002 of the current cutoff determination unit 201 at the time of a short-circuit, and thus, it is possible to prevent the disconnection identification diagnosis unit 202 from erroneously determining short-circuit failure as disconnection of the load driven by the load driving IC 102 in a process at the subsequent stage.

That is, when short-circuit failure is detected by a short-circuit abnormality detection unit, in a state in which the target current value calculated by the target current calculation unit 205 measured by the current cutoff determination unit 201 indicates a predetermined current value or more, the monitor current value flowing through the electric load (the solenoids SOL A 122A and SOL B 122B) measured by the current measurement circuit 114 which is the current monitoring unit becomes the predetermined monitor current value or less, and the duration is cleared to zero when the duration is measured. As a result, even in a case where it is erroneously determined that there is disconnection failure when short-circuit failure occurs, it is possible to avoid performing the current cutoff determination by clearing the duration to zero.

In the third embodiment, the target current calculation unit 205 that calculates a target current value flowing through an electric load (the solenoids SOL A 122A and SOL B 122B) is provided. When the short-circuit abnormality detection unit 301 detects a short-circuit state of the electric load (the solenoids SOL A 122A and SOL B 122B), the target current value calculated by the target current calculation unit 205 indicates a predetermined current value or more. When the current value flowing to the electric load (the solenoids SOL A 122A and SOL B 122B) measured by the current monitoring circuit 114 (current monitoring unit) is the predetermined monitor current value or less, and the duration is measured, the duration is cleared to zero.

According to the third embodiment of the present invention, it is possible to obtain the same effects as those of the first embodiment, and also it is possible to suppress erroneous determination of the short-circuit failure as the disconnection of the load.

Note that the above-described example is an example in which a solenoid is used the electric load, but the present invention is also applicable to a case where not only the solenoid but also other actuators such as a motor are used as the electric load.

REFERENCE SIGNS LIST 100, 100A electronic control device
101 CPU
102 load driving IC
103 battery
104 GND line
105 GND
111 PWM signal line
112 SPI Communication
113 battery voltage monitoring circuit
114 current measurement circuit
115 drive circuit
121 FET operation mode setting unit
122A SOL A, 122B SOL B solenoid
123A, 123B logic circuit
124A1, 124B1 upper FET
124A2, 124B2 lower FET
201 current cutoff determination unit
202 disconnection identification diagnosis unit
203 SPI communication unit
204 current control unit
204A control amount calculation unit
204B pulse output unit
205 target current calculation unit
301 short-circuit detection unit

The invention claimed is:

1. A vehicle-mounted control device that is supplied with a drive voltage from a voltage source via a GND line and drives a plurality of electric loads, the device comprising:

a voltage monitoring unit that measures a voltage of the voltage source to be supplied to the electric load;
a current monitoring unit that measures a current flowing through the electric load;
a driving unit that adjusts an energization amount of the electric load;
a current cutoff determination unit that determines whether to cut off the current flowing through the electric load by the driving unit; and
a disconnection identification diagnosis unit that identifies between disconnection failure of the electric load and disconnection failure of the GND line, wherein
the disconnection identification diagnosis unit identifies between the disconnection failure of the electric load and the disconnection failure of the GND line according to the voltage of the voltage source measured by the voltage monitoring unit when the current cutoff determination unit determines to cut off the current flowing through the electric load.

2. The vehicle-mounted control device according to claim 1, wherein the disconnection identification diagnosis unit determines that the disconnection failure is disconnection failure of the electric load if the voltage of the voltage source measured by the voltage monitoring unit is less than a predetermined voltage value when the current cutoff determination unit determines to cut off the current flowing through the electric load and cuts off the current of the electric load in which the disconnection failure occurs.

3. The vehicle-mounted control device according to claim 1, wherein it is determined that the disconnection failure is disconnection failure of the GND line if the voltage of the voltage source measured by the voltage monitoring unit is a predetermined voltage value or more when the current cutoff determination unit determines to cut off the current flowing through the electric load and cuts off the current of the plurality of electric loads.

4. The vehicle-mounted control device according to claim 1, further comprising:

a target current calculation unit that calculates a target current value flowing through the electric load; and
a current control unit that determines an energization amount of the driving unit such that the current flowing through the electric load becomes the target current value, wherein
the current cutoff determination unit measures a duration of a state in which the target current value calculated by the target current calculation unit is a predetermined monitor current value or more, and the monitor current flowing through the electric load measured by the current monitoring unit is a predetermined monitor current value or less, determines that there is a current cutoff request when the duration is a predetermined time or more, and cuts off the current flowing through the electric load by the driving unit.

5. The vehicle-mounted control device according to claim 1, further comprising:

a target current calculation unit that calculates a target current value flowing through the electric load; and
a current control unit that determines an energization amount of the driving unit such that a current flowing through the electric load becomes the target current value, wherein
the current cutoff determination unit determines to cut off the current flowing through the electric load after a predetermined time elapses from when the target current value calculated by the target current calculation unit is a predetermined target current value or less.

6. The vehicle-mounted control device according to claim 1, further comprising:
- a target current calculation unit that calculates a target current value flowing through the electric load; and
- a current control unit that determines an energization amount of the driving unit such that a current flowing through the electric load becomes the target current value, wherein
- the current control unit includes a control amount calculation unit that determines an energization amount of the electric load from a deviation amount between the target current value calculated by the target current calculation unit and a monitor current flowing through the electric load measured by the current monitoring unit, and
- the energization amount determined by the control amount calculation unit of the current control unit is set to a minimum energization amount when the current cutoff determination unit determines to cut off the current of the electric load.

7. The vehicle-mounted control device according to claim 1, further comprising a short-circuit detection unit that detects a short-circuit state of the electric load, wherein the short-circuit detection unit stops current cutoff determination of the current cutoff determination unit when the short-circuit state of the electric load is detected.

* * * * *